C. N. Lewis,
Pump Lift
No. 614. Reissued Oct. 26, 1858.
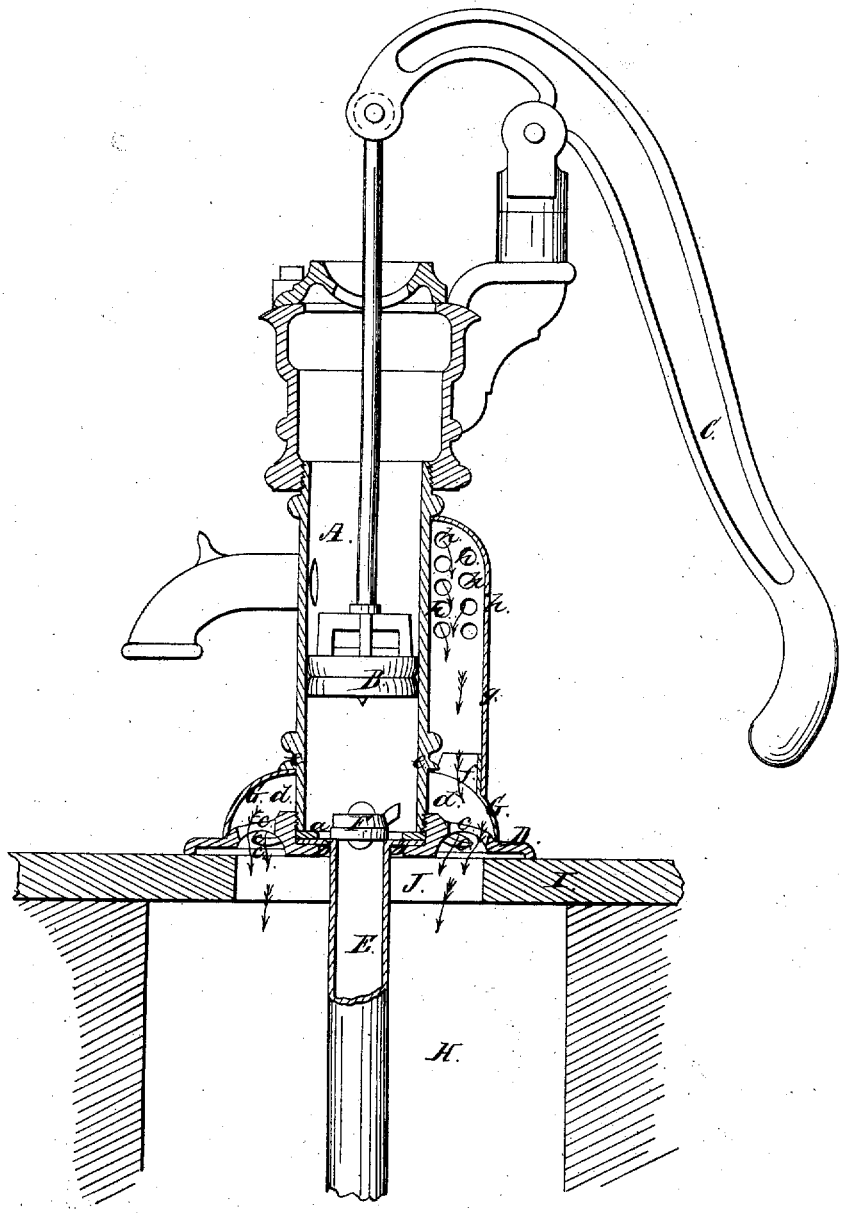
N. PETERS, PHOTO-LITHOGRAPHER, WASHINGTON, D. C.

UNITED STATES PATENT OFFICE.

GEORGE C. KING, OF SENECA FALLS, NEW YORK, ASSIGNEE OF C. N. LEWIS AND G. C. KING.

IMPROVED VENTILATING ATTACHMENT TO BE APPLIED TO PUMPS.

Specification forming part of Letters Patent No. 18,660, dated November 17, 1857; Reissue No. 614, dated October 26, 1858.

*To all whom it may concern:*

Be it known that CHARLES N. LEWIS and G. C. KING, of Seneca Falls, in the county of Seneca and State of New York, did invent a new and useful Ventilating Attachment or Device to be Applied to Pumps; and I do hereby declare that the following is a full, clear, and exact description of the same, reference being had to the annexed drawing, making a part of this specification, said drawing being a vertical central section of a pump with my improvement applied to it, also bisected.

This invention has for its object the allowing of a free access of air to the well for the purpose of ventilation, and at the same time preventing dirt, rain, waste water, and foreign substances generally from passing therein.

The above object is attained by, and the invention therefore consists in, having a perforated or open base attached to the pump, the openings being covered by a cap which is fitted around the lower end of the pump-cylinder, or inclosed within the cylinder itself, the chamber so formed communicating with a vertical tube attached to the cylinder and perforated at its upper end, the whole being arranged as will be hereinafter fully shown and described.

To enable those skilled in the art to fully understand and construct this invention, I will proceed to describe it.

A represents a pump cylinder, B the piston, and C the handle or lever.

The above parts are of usual construction, and therefore do not require a minute description.

D is the base of the pump, and the lower end of the cylinder A is secured into the center of the base, packing *a* being interposed between the lower end of the cylinder and the bottom of the recess into which the cylinder is screwed. A circular opening, *b*, is made through the center of the base to receive the suction or induction pipe E, over which the usual retaining-valve F is placed. The base D all around the cylinder A is perforated with holes *c*, and these holes are covered by a cap, G. This cap forms an annular chamber, *d*, around the lower part of the cylinder A, and the upper edge of the cap is fitted underneath a flange, E, on the cylinder A. The lower edge of the cap rests upon the base D.

To the cap G a short, square, and vertical tube, *f*, is attached. This tube is fitted within the lower end of a tube, *g*, which is attached to the side of cylinder A. The tube *g* extends upward a suitable height, and has the upper parts of its sides perforated with holes *h*.

From the above description of parts it will will be seen that the air passes through the perforations *h*, down the tube *g*, into the chamber *d*, and thence through the holes *c* into the well H, the base D being screwed down on the platform I and over an opening, J, therein. A free passage is therefore allowed for the air to pass down into the well, while dirt, waste water, and foreign substances generally, which usually pass down into wells, are by this improvement prevented from entering therein.

I do not claim, broadly, the ventilation of wells by means of air-tubes leading from the surface of the ground to the interior of the well, for I am aware that it is old. An example may be seen in the patent of D. Bartlett, 1856; but, to the best of my knowledge and belief, it is a new combination to unite a perforated ventilating-chamber and base with the pump-barrel in such a manner that the ventilator shall constitute a part of the pump, whereby, when the pump is applied, the ventilator is also applied, and becomes operative from the moment the pump is set.

What I claim and desire to secure by Letters Patent, is—

The arrangement and combination of the perforated base D, cap G, and perforated tube *g*, or their equivalents, with the pump-barrel A, as herein set forth, whereby the ventilator becomes attached to and forms a part of the pump, all as herein specified.

GEORGE C. KING,
*Assignee in full of C. N. Lewis and G. C. King.*

Witnesses:
J. D. POLLARD,
E. MILLER.